(12) United States Patent
Nark et al.

(10) Patent No.: US 9,245,089 B1
(45) Date of Patent: Jan. 26, 2016

(54) STATISTICALLY BASED APPROACH TO BROADBAND LINER DESIGN AND ASSESSMENT

(71) Applicant: The United States of America as represented by the Administrator of the National Aeronautics and Space Administration, Washington, DC (US)

(72) Inventors: Douglas M. Nark, Norfolk, VA (US); Michael G. Jones, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 305 days.

(21) Appl. No.: 13/781,918

(22) Filed: Mar. 1, 2013

Related U.S. Application Data (60) Provisional application No. 61/679,093, filed on Aug. 3, 2012.

(51) Int. Cl.
*G06G 7/48* (2006.01)
*G06F 17/50* (2006.01)
*B64D 33/02* (2006.01)

(52) U.S. Cl.
CPC .... *G06F 17/5095* (2013.01); *B64D 2033/0206* (2013.01)

(58) Field of Classification Search
CPC .................................................. G06F 17/5095
USPC ............................................................ 703/8
See application file for complete search history.

(56) References Cited

PUBLICATIONS

Dittmar et al.: Some Acoustic Results from the Pratt and Whitney Advanced Ducted Propulsor- Fan I; NASA/TM—1999-209049; 82 pp.*
Gerhold & Inventors: Advanced Computational and Experimental Techniques for Nacelle Liner Performance Evaluation; AIAA 2009-3168; 15th AIAA/CEAS conf. 2009; pp. 1-22.*
Nark et al. inventors: Uncertainty and Sensitivity Analyses of Duct Propagation Models; AIAA 2008-2832 (14th ann AIAA/CEAS conf.; pp. 1-13.*
Nark et al. inventors: Broadband Liner Optimization for the Source Diagnostic Test Fan; 18th AIAA/CEAS aeroacoustics conference 2012; 33rd AIAA aeroacoustics conference; 13 pp.*
Nark inventor: On Acoustic Source Specification for Rotor-Stator Interaction Noise Prediction; 2010; Conference: 16th AIAA/CEAS Aeroacoustics Conference (31st AIAA Aeroacoustics Conference; 17 pp.*
Jones inventors: Effects of Flow Profile on Educed Acoustic Liner Impedance; 16th AIAA/CEAS Aeroacoustics Conference; Jun. 7-9, 2010; Stockholm; Sweden; 23 pp.*

(Continued)

*Primary Examiner* — Hugh Jones
(74) *Attorney, Agent, or Firm* — Andrea Z. Warmbier (57) ABSTRACT

A broadband liner design optimization includes utilizing in-duct attenuation predictions with a statistical fan source model to obtain optimum impedance spectra over a number of flow conditions for one or more liner locations in a bypass duct. The predicted optimum impedance information is then used with acoustic liner modeling tools to design liners having impedance spectra that most closely match the predicted optimum values. Design selection is based on an acceptance criterion that provides the ability to apply increasing weighting to specific frequencies and/or operating conditions. One or more broadband design approaches are utilized to produce a broadband liner that targets a full range of frequencies and operating conditions.

13 Claims, 8 Drawing Sheets

(56) References Cited

PUBLICATIONS

Watson and inventors: Assessment of 3D Codes for Predicting Liner Attenuation in Flow Ducts; 2008-2828 Conference: 14th AIAA/CEAS Aeroacoustics Conference (29th AIAA Aeroacoustics Conference); 20 p.*

Feiler Recent Results About Fan Noise—Its Generation, Radiation and Suppression; Ann. Meeting of the Soc. of Eng. Sci.; 19th; Oct. 27-29, 1982; Rolla, MO; United States; 25 pp.*

Farassat et al. and inventor: Open Rotor Noise Prediction Methods at NASA Langley—A Technology Review; FF, MHD, AT & DMN—AIAA 2009.nb; 2009; 20pp.*

Mani et al. and inventors: Improved Inlet Noise Attenuation by Alteration of Boundary Layer Profiles; Williamsburg, Virginia; ACTIVE 04; Sep. 20-22, 2004; 16. pp.*

Nark inventor: Fan Noise Prediction with Applications to Aircraft System Noise Assessment; 15th AIAA/CEAS Aeroacoustics Conference (30th AIAA Aeroacoustics Conference) May 11-13, 2009, Miami, Florida; 16 pp.*

Parrott, T. L, et el., "Parallel-element Liner Impedances for Improved Absorption of Broadband Sound in Ducts," Journal of Noise Control Engineering, 1995, pp. 183-195, vol. 43, No. 6.

Nark, D. M., et al., "The Development of the Ducted Fan Noise Propagation and Radiation Code CDUCT-LARC," AIAA, 2003, pp. 1-8.

Zlavog. G., et al., "Source Effects on Attenuation in Lined Ducts, Part I: A Statistically Based Computational Approach," Journal of Sound and Vibration, 2007, pp. 113-138, vol. 307.

Nark, D. M., et al., "On Acoustic Source Specification for Rotor-Stator Interaction Noise Prediction," AIAA, 2010, pp. 1-17.

* cited by examiner

Fig. 2 Prior Art (a) Approach BPF (2863 Hz)

Fig. 3a (b) Takeoff 2BPF (9282 Hz)

Fig. 5a  Fig. 5b (a) Normalized Resistance

Fig. 6a (b) Normalized Reactance

(a) Normalized Resistance
Fig. 8a (b) Normalized Reactance
Fig. 8b (a) Normalized Resistance
Fig. 9a (b) Normalized Reactance
Fig. 9b (a) Normalized Resistance
Fig. 10a (b) Normalized Reactance
Fig. 10b (a) Normalized Resistance
Fig. 11a (b) Normalized Reactance
Fig. 11b (a) Normalized Resistance
Fig. 12a (b) Normalized Reactance
Fig. 12b (a) Normalized Resistance
Fig. 13a (b) Normalized Reactance
Fig. 13b

(a) Approach flow condtion
Fig. 14a

(b) Cutback flow condtion
Fig. 14b (c) Takeoff flow condtion
Fig. 14c (a) Approach flow condtion
Fig. 15a (b) Cutback flow condtion
Fig. 15b (c) Takeoff flow condtion
Fig. 15c

STATISTICALLY BASED APPROACH TO BROADBAND LINER DESIGN AND ASSESSMENT

CROSS-REFERENCE TO RELATED APPLICATIONS

This patent application is a nonprovisional of, and claims the benefit of and priority to, U.S. Provisional Patent Application No. 61/679,093, filed on Aug. 3, 2012, the entire contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Accurate aircraft engine noise prediction is an important component of overall aircraft system noise assessment. The ability to predict fan noise within complex aircraft nacelle geometries vital in optimizing acoustic liner treatment. With the utilization of increased bypass ratio and advanced fan designs, the broadband component of fan noise has grown in relevance. Thus, while the attenuation of fan tones remains paramount, the ability to simultaneously reduce broadband fan noise levels has become more attractive. In conjunction with this trend, a number of fan noise prediction assessments have provided valuable insights into improved fan noise propagation/radiation prediction with limited fan source information. Advanced manufacturing techniques have also opened new possibilities for the implementation of broadband liner concepts. Therefore, the ability to perform broadband liner design using methods that integrate duct acoustic propagation/radiation and liner modeling tools would facilitate the development of novel liner concepts.

BRIEF SUMMARY OF THE INVENTION

The present invention alleviates the difficult task of generating aircraft engine nacelle liner designs having broadband sound absorption for configurations where detailed information regarding the fan noise source is unavailable. Single-layer perforate-over-honeycomb liners may be used for absorption of individual fan tone frequencies and their harmonics. Extension to include broadband sound absorption is generally achieved via multi-layer acoustic liners (generally 2, but sometimes 3 layers). These designs are driven by the fidelity of the prediction tools, as well as geometric constraints. Some approaches to liner optimization have focused on narrow-band attenuation spectra (i.e., target individual fan tones) and are generally not broadband in character. Also, intrinsic knowledge of the acoustic source is generally incorporated into these optimization approaches.

According to one aspect of the present invention, an acoustic duct propagation and radiation code is used on a computer system, which comprises at least one computer processor, to predict optimum impedance spectra over operating conditions of interest. In the absence of fan source information, a statistical representation may be used that allows for the generation of 95% confidence intervals for the predicted metric. The cost function for this impedance optimization is based on in-duct, near-field, and/or far-field results. For example, in one embodiment, the optimum may be based on maximum in-duct attenuation. However, acoustic radiation predictions may also be utilized, and the cost function may be based on acoustic quantities at selected external locations.

After the optimum impedance spectra is determined, acoustic liner modeling tools (i.e. code) are used on the computer processor to identify geometric liner parameters (within manufacturing constraints) necessary to produce impedance spectra that most closely match the optimum impedance spectra. Design selection may be based on acceptance criteria that provide the ability to apply increased weighting to specific frequencies and/or operating conditions.

Because of the aforementioned geometric constraints, the resultant liners provide impedance values that differ from the optimum values. Thus, the design impedance values may be used in the propagation/radiation code to evaluate liner performance. This assessment may again be based on in-duct, near-field, and/or far-field results. For example, in one instance, the in-duct attenuation may used. Alternatively, an acoustic parameter or performance metric based on the integrated attenuation spectra (on a power basis) over the full frequency range may be employed. As with the design impedance cost function, weighting of specific frequencies/operating conditions could also be introduced in this performance metric. If the assessment does not yield acceptable results, iteration between the liner design and evaluation stages is possible. The following references are incorporated by reference in their entireties:

Parrott, T. I. and Jones, M. G, Parallel-element Liner Impedances for Improved Absorption of Broadband Sound in Ducts, Journal of Noise Control Engineering, Vol. 43, No. 6, 1995;

Nark, D. M, Farassat, F., Pope, D. S., and Vatsa, V, The Development of the Ducted Fan Noise Propagation and Radiation Code CDUCT-LaRC, AIAA Paper 2003-3242, 2003;

Zlavog, G. and Eversman, W., Source effects on attenuation in lined ducts. Part I: A statistically based computational approach, Journal of Sound and Vibration, Vol. 307, No. 1-2, 2007, pp. 113-138; and Nark, D. M, Envia, E., and Burley, C. L., On Acoustic Source Specification for Rotor-Stator Interaction Noise Prediction, AIAA Paper 2010-3713, 2010.

The present invention makes it possible to take advantage of advanced manufacturing techniques that allow acoustic liners to be customized such that the surface impedance of each individual cell is independently controlled. Duct acoustic propagation/radiation and liner modeling tools are integrated to design broadband liners to achieve acceptable sound absorption over a wide frequency range. The ability to use a statistical source model also provides the added benefit of generating confidence intervals for the predicted liner performance.

These and other features, advantages, and objects of the present invention will be further understood and appreciated by those skilled in the art by reference to the following specification, claims, and appended drawings.

DETAILED DESCRIPTION OF THE INVENTION

Figure 1:
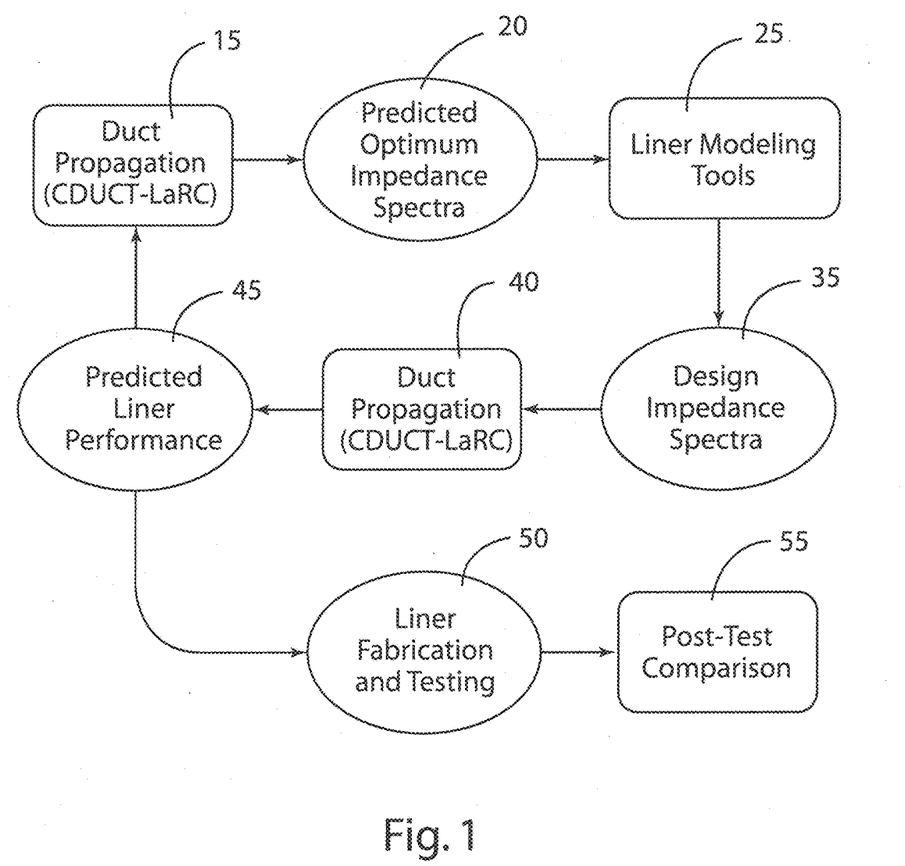
FIG. 1 is a flow chart showing an acoustic liner design according to one aspect of the present invention.
Figure 1A:
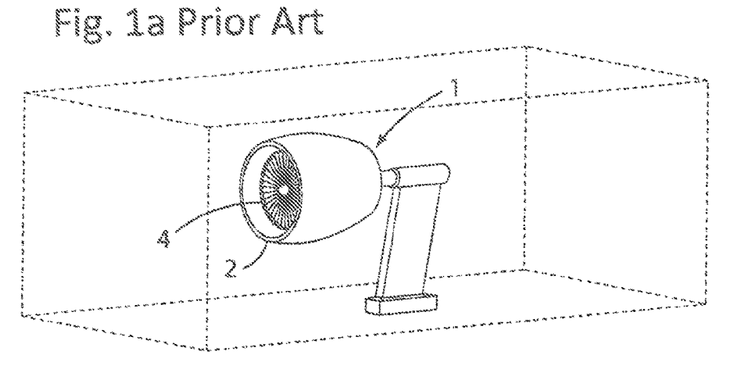
FIG. 1a shows a model fan installed in a wind tunnel.

For purposes of description herein, the terms "upper," "lower," "right," "left," "rear," "front," "vertical," "horizontal," and derivatives thereof shall relate to the invention as oriented in FIG. 1a. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present application relates to a method for designing acoustic liners to absorb noise. Acoustic liners may be utilized in various applications. For example, acoustic liners may be utilized in aircraft to absorb engine noise, or noise generated due to airflow around various aircraft components such as wing flaps, landing gear, or other structures. The liners may be designed to provide a desired acoustic affect within the available constraints. For example, if the noise source in question is an aircraft engine, the liner may be optimized to reduce noise by maximizing attenuation within the engine nacelle (duct). Other design goals may be utilized. For example, the liners in the engine may be designed to minimize radiated noise at a specific location relative to the engine. For example, the liners may be designed to minimize the noise of the aircraft that would be heard by a person on the ground at a specified relative location as the aircraft takes off or lands. Thus, in general, the present method involves selecting a noise parameter to be optimized according to predefined criteria. In the illustrated example, the method of the present invention may be utilized to design one or more liners 6-9 (FIG. 2) of an aircraft engine 1 (FIG. 1a). Referring to FIG. 1, acoustic prediction software is utilized at step 15 to provide predicted optimum impedance spectrum 20 for various aircraft operating conditions. The acoustic prediction software may comprise duct propagation software. As discussed in more detail below, the predicted optimum impedance spectra 20 are selected to provide an optimum possible outcome with respect to the noise parameter selected for evaluation. The predicted optimum impedance spectra 20 are then utilized in connection with liner modeling tools at step 25 to design acoustic liners having impedance characteristics that match the predicted optimum impedance spectra 20 as closely as possible according to predefined criteria. The design impedance spectra data 35 may then be utilized in the duct propagation code at step 40 to provide a predicted liner performance 45. If the predicted liner performance 45 is determined to be satisfactory, liner fabrication and testing 50 and post-test comparison 55 may be conducted. If the predicted liner performance 45 is not satisfactory, the liner design can be modified, and the duct propagation code can again be utilized at step 15 to refine the liner design. The liner design can then be finalized utilizing an iterative approach utilizing the duct propagation code.

Figures 2, 3A, 3B:
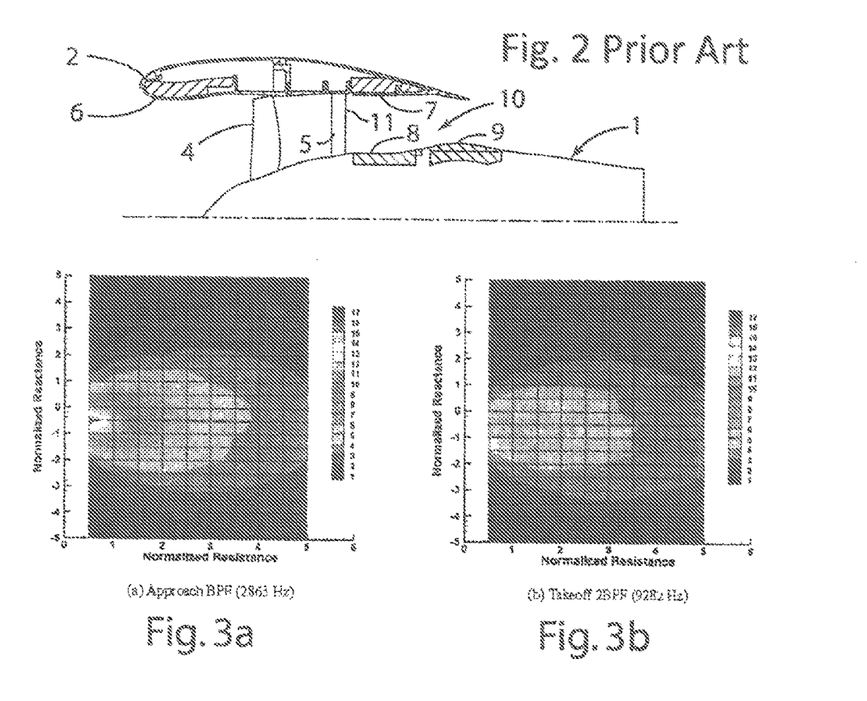
FIG. 2 is a cross sectional view of a portion of the model fan of FIG. 1.
FIG. 3a shows mean attenuation contours (Approach flow condition) for approach BPF (2863 Hz)
FIG. 3b shows mean attenuation contours (Approach flow condition) for takeoff 2 BPF (9282 Hz)

In the illustrated example, engine 1 comprises an existing fan rig. Engine 1 has a design corrected tip speed of 1,215 ft/sec, a stage pressure ratio of 1.47, and a bypass ratio of 8.9. The fan stage has 22 blades 4 (see also FIG. 2) and 54 stator vanes 5 in its baseline configuration. With further reference to FIG. 2, engine 1 may include an inlet liner 6 and aft liners 7, 8, and 9 facing bypass duct 10. The three aft liners 7, 8 and 9 are discussed herein to illustrate the design method of the present invention. For purposes of the present example, the impedance spectra for the aft liners 7, 8, and 9 were set to be the same. However, the liners 7, 8, and 9 could use different impedance spectra. Also, it will be understood that the present invention may be utilized to design acoustic liners utilized in other areas of aircraft, and for liners utilized on land vehicles or stationary structures.

The fan speeds of interest, provided in Table 1, are representative of the three noise certification measurement points (approach, cutback, and takeoff). It will be understood that these frequencies are examples, and the actual frequencies will depend on the particular aircraft and operating conditions to be evaluated. Furthermore, the present invention may be utilized to design liners that reduce noise at a plurality of specified frequencies, wherein the specified frequencies are not related to blades of an aircraft engine.

TABLE 1

SDT Model Fan Tip Speed Conditions

| Condition | $M_{ave}$ (STE) | Corrected RPM | % Design Speed | BPF (Hz) | 2BPF (Hz) |
|---|---|---|---|---|---|
| Approach | 0.262 | 7,809 | 61.7 | 2863 | 5726 |
| Cutback | 0.343 | 11,075 | 87.5 | 4061 | 8122 |
| Takeoff | 0.374 | 12,657 | 100.0 | 4641 | 9282 |

The mean flow associated with these fan speeds is based on Computational Fluid Dynamics (CFD) simulations of the aft bypass duct 10. From these simulations, the average Mach number at the trailing edges 11 of the stator vanes 5, $M_{ave}$ (STE), is used as the starting value for one-dimensional Mach/Area calculations. The resultant Mach number distributions in the bypass duct 10 are then used for in-duct propagation predictions. The frequencies considered are also included in Table 1 and are based on the blade passage frequency (BPF) and first harmonic (2 BPF) at the approach, cutback, and takeoff fan speeds. This range of frequencies was selected to provide sufficient broadband coverage and including all six frequencies at each of the three flow speeds leads to a total of 18 different test points of interest. However at any particular flow condition, only the corresponding BPF and 2 BPF frequencies represent likely tones, the other four frequencies represent broadband frequency points that may be utilized for design purposes.

With further reference to FIG. 1, in-duct propagation predictions are conducted at step 15. The duct propagation calculations 15 may be conducted utilizing a known code.

For example, suitable known code for performing the duct propagation and radiation predictions 15 is the CDUCT-LaRC (CDL) code. This code calculates the propagation of a given acoustic source ahead of the fan face or aft of the exhaust guide vanes in the inlet or exhaust ducts, respectively. Subsequent to the propagation calculations, the code has the capability of computing the noise radiation field outside the duct. The three-dimensional duct may be acoustically lined (possibly circumferentially and radially segmented) in specified areas and incorporate struts/bifurcations. All of the modules that make up the CDL code have been described in prior publications. With respect to the present invention, the propagation and radiation modules of the CDL code are the most pertinent modules.

The duct propagation module is based on the CDUCT code developed by Dougherty and extended by Lan. This code utilizes a parabolic approximation to the convected Helmholtz equation and offers a computationally efficient model that accounts for the complexities of fully three-dimensional nacelle configurations. The CDL code has been extended to support multi-block propagation calculations. The grid connectivity is determined and data is transferred from upstream to downstream blocks without user intervention. Results of the propagation module include the acoustic potential or pressure within a duct 10, which may be utilized by the radiation module for acoustic radiation calculations.

The duct radiation model is based on the Ffowcs Williams-Hawkings (FW-H) equation with a permeable data surface. Use of this equation for many acoustic problems has shown it to generally provide better results than the Kirchhoff formula for moving surfaces. Based on the background flow conditions and propagation solution, this module calculates the radiated acoustic pressure at selected observer locations. Currently, the data surface is taken to be the nacelle inlet or exhaust plane for inlet or aft-fan cases, respectively. However, provisions have also been made to account for the effects of the shear layer on the radiation.

Although the CDL code can accept arbitrary source specification (i.e., it is not a modal code), it is convenient to specify the acoustic source distribution in terms of duct modes. For situations in which the source pressure is available, this greatly simplifies the conversion to the required acoustic potential. However, when source information is not available, an assumption on the source description must be made. This is generally the case and the approach taken herein follows that described by Zlavog and Eversman in a series of statistical studies into the effects of randomized modal source power and/or phase on attenuation in lined ducts. A method according to one aspect of the present invention includes use of random inputs if source pressure information is not available. According to this aspect of the present invention, the source modal powers (and hence, amplitudes) and modal phases are allowed to vary randomly and independently. Thus, with equal probability of occurrence, the amplitude and phase for each cut-on source mode may take any value in the intervals from 0 to 1 and 0 to $2\pi$, respectively. This uncertainty in source specification results in uncertainty with respect to the predicted sound levels. However, as discussed by Zlavog and Eversman, for the case of all propagating circumferential and radial acoustic modes with random modal power and phase, transmitted power appears to be normally distributed. In their statistical studies, this also produced statistical distributions with the least standard deviation. Therefore, as discussed in a prior art CDL publication, Student's t-distribution is used to statistically analyze the predicted attenuation results. In the present example, for each configuration and power setting. 11 simulations are performed at step 15 (FIG. 1) to produce a sample population from which mean, p, and standard deviation, $\sigma$, values can be inferred. More simulations can be performed to provide greater certainty with respect to the predicted results. Conversely, fewer simulations can be performed if less certainty is required.

The optimal impedance spectra 20 is predicted at step 15 using the CDL code on the computer processor with the aforementioned source model. While a number of quantities may be used to formulate a cost function for the impedance optimization, the in-duct attenuation is discussed herein to provide an example of a design process according to one aspect of the present invention. The impedance domain considered in this example extends over a normalized resistance range of $0<\theta\leq5$ and a normalized reactance range of $-5\leq X\leq 5$. Relatively large initial step sizes (e.g. 0.5) may be used to generate preliminary attenuation contours and optimum impedance prediction. A sub-domain with a smaller step size (e.g. 0.2) may then be generated about this impedance value to obtain a refined optimum impedance prediction. Thus, for a given frequency and flight condition, the optimum impedance is taken to be the value for which the predicted mean in-duct attenuation is maximum. Although the in-duct attenuation is used to select the optimum impedance spectra in this example, the acoustic radiation module may be utilized to predict directivity patterns, which are relevant for comparison with test measurements and community noise assessment.

Figure 4A:
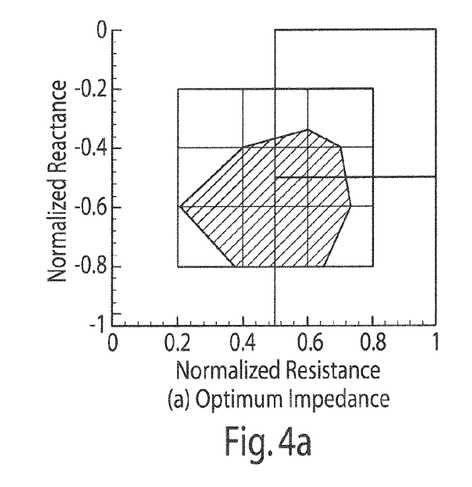
FIG. 4a shows mean attenuation contours (Approach BPF: 2863 Hz), wherein the crosshatched region represents impedance values for which the 95% confidence interval for the mean attenuation overlaps with that for the optimum impedance value.
Figure 4B:
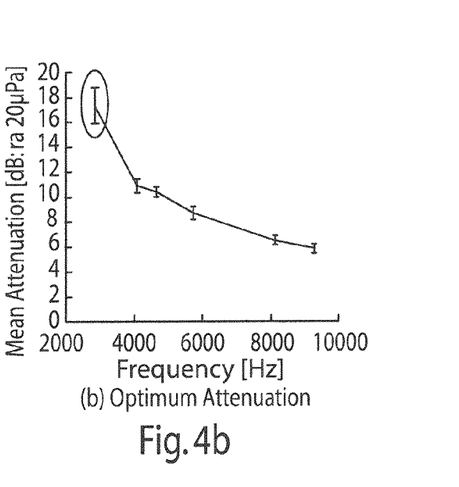
FIG. 4b is a graph showing optimum attenuation with error bars representing the 95% confidence interval in the mean attenuation at the optimum impedance.
Figure 5A:
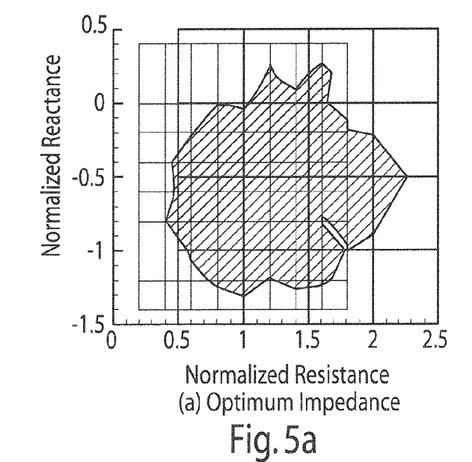
FIG. 5a shows mean attenuation contours (Takeoff 2 BPF: 9282 Hz), wherein the crosshatched region represents impedance values for which the 95% confidence interval for the mean attenuation overlaps with that for the optimum impedance value.
Figure 5B:
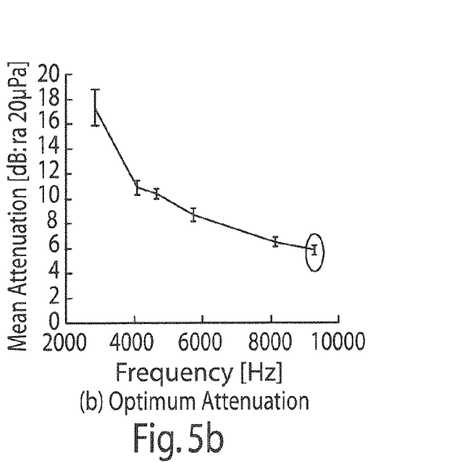
FIG. 5b is a graph showing optimum attenuation with error bars representing the 95% confidence interval in the mean attenuation at the optimum impedance.

To further illustrate an optimum impedance prediction utilizing in-duct attenuation, the initial contours at the approach flow speed for the lowest (2863 Hz: BPF at approach) and highest (9282 Hz: 2 BPF at takeoff) frequencies considered are shown in FIGS. 3a and 3b, respectively. Noting that the scales are the same in FIGS. 3a and 3b, a much larger gradient can be seen about the maximum mean attenuation achieved at 2863 Hz versus that at 9282 Hz. Thus, a much smaller sub-domain, extending beyond the initial domain boundary, may be utilized for the lower frequency. Recognizing the difficulty in matching the predicted optimum exactly, the contours are used to define a target "cloud" of impedance values in the neighborhood of optimum. In defining this target "cloud", one could simply accept any impedance value for which the predicted mean attenuation is within a certain tolerance (e.g., 2 dB) of that achieved with the optimum impedance. However, the task of selecting an appropriate tolerance level remains. In this case, statistical information in the form of 95% confidence intervals, which are different at each impedance value, is available. Therefore, the target "cloud" of impedance values is taken to include all impedances for which the 95% confidence interval overlaps that associated with the predicted optimum impedance value. FIGS. 4a and 4b illustrate this information for the mean attenuation results at 2863 Hz. In FIG. 4a, the shaded area represents the "cloud" of impedance values described above for which the 95% confidence interval for the mean attenuation overlaps with that for the optimum impedance value. FIG. 4b shows the corresponding mean attenuation (indicated by the oval) at the optimum impedance with error bars representing the associated 95% confidence interval. For comparison purposes, the same information is provided in FIGS. 5a and 5b for 9282 Hz at the approach condition. At 2863 Hz, it can be seen that the largest mean attenuation (with a relatively large 95% confidence interval) is achieved over a relatively small impedance range. Conversely, at 9282 Hz, a much lower mean attenuation (with a much smaller 95% confidence interval) is achieved over a much larger range of impedance values.

Figure 6A:
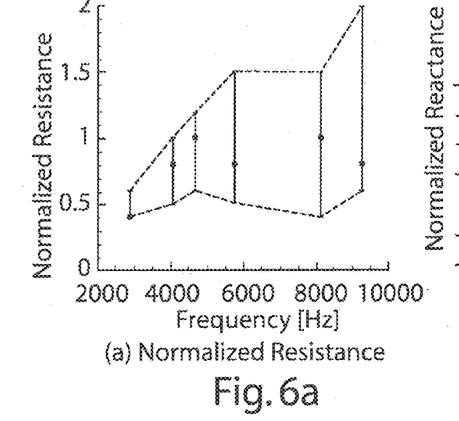
FIG. 6a is a graph showing optimum normalized resistance values denoted by circles (Approach flow condition) wherein error bars indicate resistance values for which the 95% confidence interval for the mean attenuation overlaps with that for the optimum resistance value.
Figure 6B:
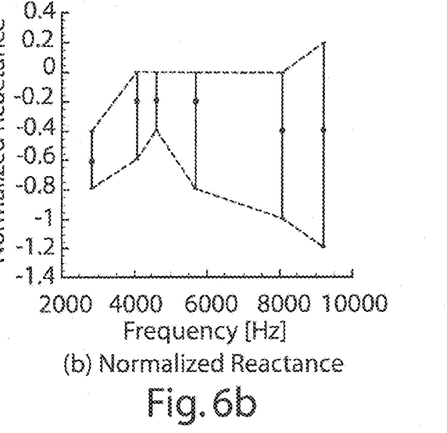
FIG. 6b is a graph showing optimum normalized reactance values denoted by circles (Approach flow condition) wherein error bars indicate reactance values for which the 95% confidence interval for the mean attenuation overlaps with that for the optimum reactance value.

Optimum impedance predictions for all six frequencies at the approach flow condition are consolidated in the normalized resistance and reactance plots in FIGS. 6a and 6b. Optimum impedance values are denoted by circles. Error bars indicate the range of impedance values for which the 95% confidence interval overlaps that of the optimum impedance value. The dashed lines indicate the envelope of "acceptable" impedance values. As discussed below, similar information may be obtained for the cutback and takeoff conditions. The predicted optimum impedance spectrum 20 (FIG. 1) generally corresponds to the results shown in FIGS. 4a-6b. It will be understood that the form of predicted optimum impedance spectra is not limited to the specific examples of FIGS. 4A-6b.

As indicated above, in an example according to one aspect of the present invention, the CDL propagation code is used to determine optimum impedance values 20 (FIG. 1) for the liner locations 7, 8, and 9 in the aft bypass duct 10 at selected flow conditions and frequencies. At step 25, the predicted optimum impedances 20 are utilized to design a liner having impedances that most closely match the predicted optimum impedances according to predefined acceptance criteria. The target "clouds" of impedance values (e.g. FIGS. 4a and 4b) may be utilized in the linear design process. For example, the liner design may involve designing a liner having impedances falling within the "cloud" of impedances for as many aircraft operating conditions as possible. In this example, the liner 30 (FIG. 7) comprises a multi-layer configuration that incorporates buried septa ("mesh-caps") 32 embedded into a honeycomb core 31. The liner 30 may comprise a single layer liner 30a, a liner 30b having uniform depth, or a liner 30c having variable depth meshcaps 32. The liner 30 generally includes a honeycomb core 31, a backplate 28, and a facesheet 29. This configuration allows the acoustic liner 30 to be customized such that the surface impedance of each individual cell 33 is independently controlled. This is achieved by the combination of parameters used to set the impedance in each cell 33. The various cells 33 are then customized into a grid pattern of different mesh-cap depths or resistances within the acoustic panel to achieve a desired distributed impedance. This type of liner can be utilized to achieve broadband performance. However, it will be understood that a wide variety of liner configurations may be utilized in accordance with the present invention.

Figure 7:
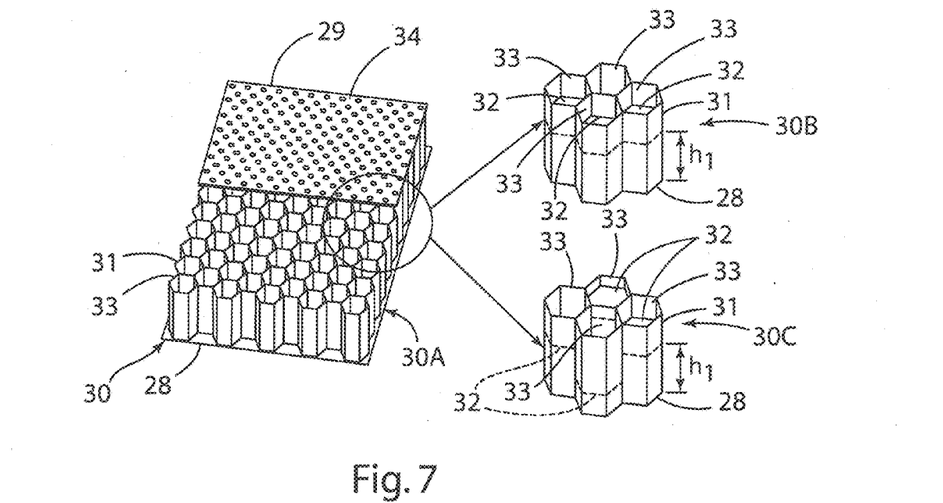
FIG. 7 is an isometric view of a parent single layer liner and resultant two-layer liner configurations (uniform and variable depth) formed via mesh-cap insertion.

Clearly, geometric (e.g., liner geometric parameters such as porosity and core depth) and manufacturing (e.g., grid pattern size) constraints are key ingredients in this modeling step/phase 25, and must be taken into account to design acoustic liners that can be realistically achieved. In the present example, the honeycomb cells 33 are restricted to contain one mesh-cap 32. The mesh-cap depth, as well as its DC flow resistance, are allowed to vary from cell to cell. Finally, based on currently available manufacturing techniques, the customizable grid pattern was limited to a configuration of four cells. Representative liner configurations resulting from mesh-cap insertion are shown in FIG. 7 to illustrate the two-layer setup and geometrical parameters.

All liners are assumed to have a 0.032 in (0.081 cm) thick perforate facesheet 29 containing 0.032 in (0.081 cm) diameter holes 34. Due to the relatively low target optimum resistance values utilized in the present example, a rather unconventional 60% open area was selected for the facesheet 29. This reduces the impact of the facesheet 29 on the overall resistance and allows for greater flexibility in tuning the resistance of individual cells 33. In this example, the liner core is comprised of a 0.375-inch (0.953 cm) diameter hexcel-shaped honeycomb core 31 with an overall depth of 2.0 inches (5.08 cm). In this example, mesh-cap materials ranging in DC flow resistance values from 600 to 1200 MKS Rayls were considered in step 35. Additionally, the distance between the mesh-cap 32 and liner backplate 28 $h_1$, was allowed to vary (FIG. 7). In the design process, this value ranges from 0.20 in (0.508 cm) to 1.80 in (4.57 cm) in 0.20 in (9.508 cm) increments. It will be understood that the specific liner configuration discussed above comprises one example of a possible liner configuration. Other liner designs may also be utilized as required.

An optimization process may be utilized at step 25 (FIG. 1) to determine the best combination of geometrical parameters to achieve the desired impedance values. Prediction tools (code) based on the combination of a transmission line calculation and the Two-Parameter Impedance Prediction Model may be used to model the resultant liner impedance spectra. Suitable prediction code is known in the art, and the details of the code will not therefore be described in detail herein.

Different design approaches may be utilized according to the present invention. Four design approaches are discussed below. These design approaches utilize different combinations of the six frequencies and three flight conditions in Table 1. The CDL in-duct propagation results 20 provide predicted optimum impedance values, $\zeta_{opt,i}$, at each specific combination of flow speed and frequency. The liner modeling tools are then used at step 25 to obtain design impedance values 35. The design impedance values, $\zeta_{pred,i}$, minimize the function:

$$F = \left\{ \sum_{i=1}^{N} W_i (\zeta_{opt,i} - \zeta_{pred,i})(\zeta_{opt,i} - \zeta_{pred,i})^* \right\}^{0.5}$$

Here, the values $W_i$ are weighting values that may be used to assign increased importance to a selected number of frequencies and/or flow conditions and N is the total number of frequency/flow condition combinations included. Note that with $W_i=1$ for all N, equation 1 reduces to the $L_2$ norm of the difference between the predicted optimum and the design impedance values.

A first design approach focuses on a single frequency at the corresponding flow speed. For example, 2 BPF at cutback (i.e., 8122 Hz) is considered where N=1 and $W_i=1$ for that frequency and flow condition. These liner designs correspond to a typical approach where a single blade tone is targeted. Thus, six initial point designs (BPF and 2 BPF at approach, cutback, and takeoff) were generated to provide a baseline for liner performance evaluation.

Figure 8A:
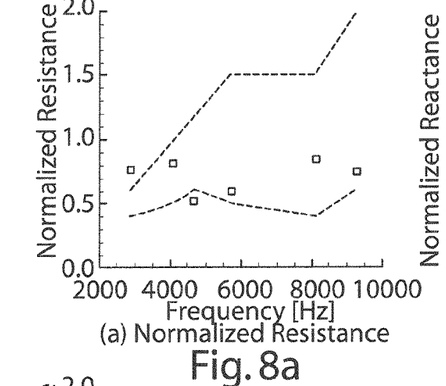
FIG. 8a is a graph showing single tone design (targeting 2 BPF (8122 Hz) at cutback) normalized resistance values denoted by squares (Approach flow condition), for which 95% confidence intervals for optimum designs are denoted via dashed lines.
Figure 8B:
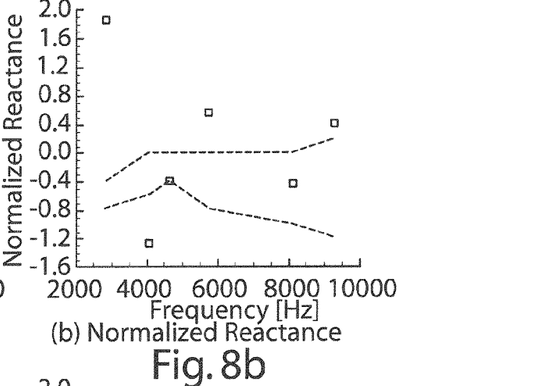
FIG. 8b is a graph showing single tone design (targeting 2 BPF (8122 Hz) at cutback) normalized reactance values denoted by squares (Approach flow condition), for which 95% confidence intervals for optimum designs are denoted via dashed lines.
Figure 9A:
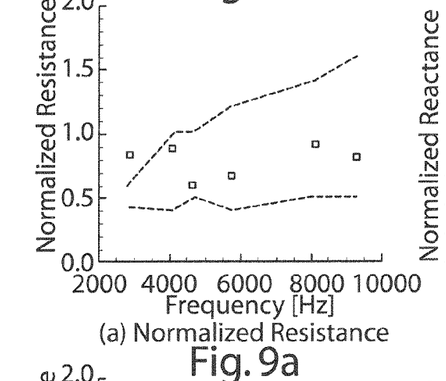
FIG. 9a is a graph showing single tone design (targeting 2 BPF (8122 Hz) at cutback) normalized resistance values denoted by squares (Cutback flow condition), for which 95% confidence intervals for optimum designs are denoted via dashed lines.
Figure 9B:
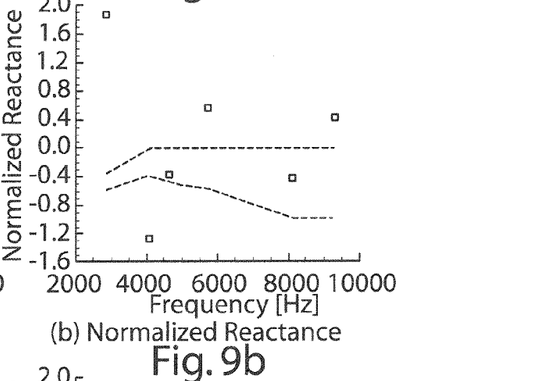
FIG. 9b is a graph showing single tone design (targeting 2 BPF (8122 Hz) at cutback) normalized reactance values denoted by squares (Approach flow condition), for which 95% confidence intervals for optimum designs are denoted via dashed lines.
Figure 10A:
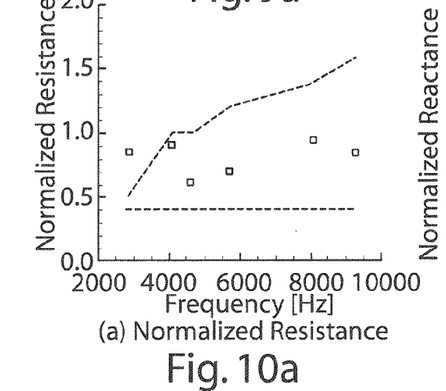
FIG. 10a is a graph showing single tone design (targeting 2 BPF (8122 Hz) at cutback) normalized resistance values denoted by squares (Takeoff flow condition), for which 95% confidence intervals for optimum designs are denoted via dashed lines.
Figure 10B:
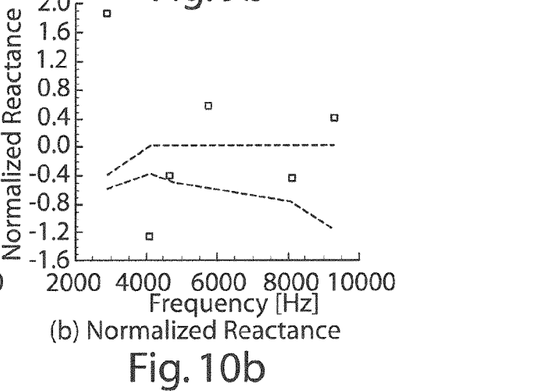
FIG. 10b is a graph showing single tone design (targeting 2 BPF (8122 Hz) at cutback) normalized reactance values denoted by squares (Takeoff flow condition), for which 95% confidence intervals for optimum designs are denoted via dashed lines.
Figures 11A, 11B:
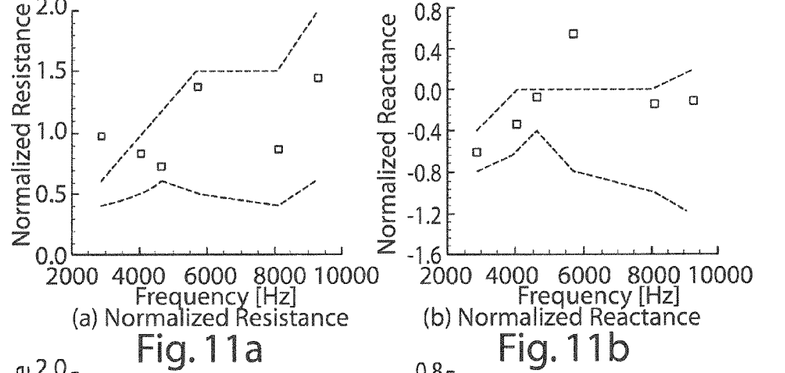
FIG. 11a is a graph showing broadband design normalized resistance values denoted by squares (Approach flow condition), for which 95% confidence intervals for optimum designs are denoted via dashed lines.
FIG. 11b is a graph showing broadband design normalized reactance values denoted by squares (Approach flow condition), for which 95% confidence intervals for optimum designs are denoted via dashed lines.
Figure 12A:
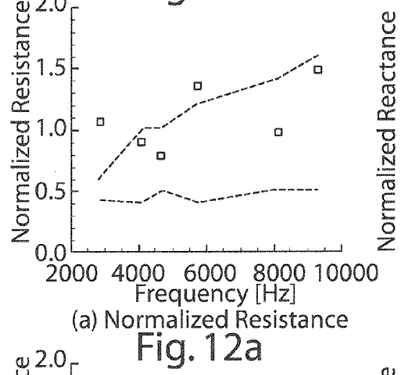
FIG. 12a is a graph showing broadband design normalized resistance values denoted by squares (Cutback flow condition), for which 95% confidence intervals for optimum designs are denoted via dashed lines.
Figure 12B:
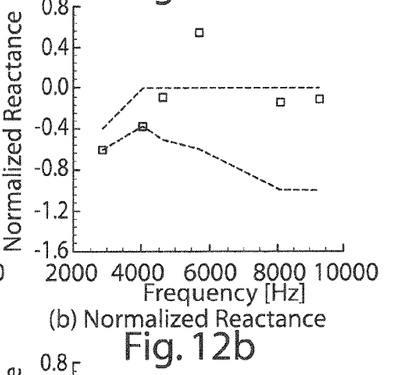
FIG. 12b is a graph showing broadband design normalized reactance values denoted by squares (Cutback flow condition), for which 95% confidence intervals for optimum designs are denoted via dashed lines.
Figure 13A:
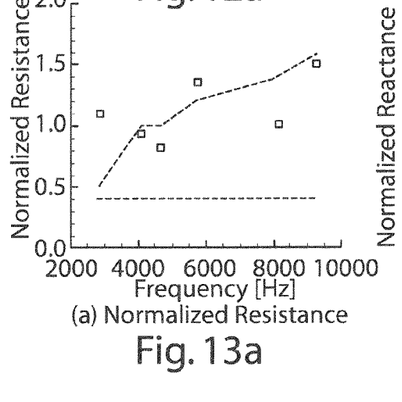
FIG. 13a is a graph showing broadband design normalized resistance values denoted by squares (Takeoff flow condition), for which 95% confidence intervals for optimum designs are denoted via dashed lines.
Figure 13B:
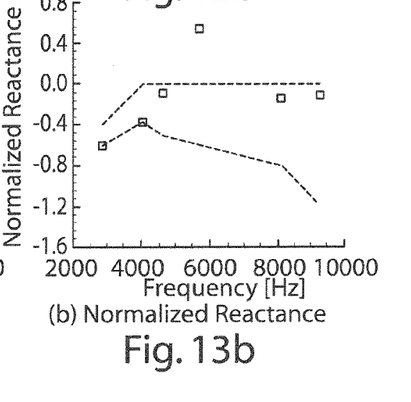
FIG. 13b is a graph showing broadband design normalized reactance values denoted by squares (Takeoff flow condition), for which 95% confidence intervals for optimum designs are denoted via dashed lines.

To illustrate these single tone designs, comparisons of optimum impedance values and those of the design targeting 2 BPF at cutback are shown in FIGS. 8-10. In these figures, the design impedance values are denoted by squares and the envelope of "acceptable" impedance values is represented with dashed lines. Note that the impedance values at 8122 Hz are within the acceptance criteria across all three flow conditions. However, the impedance values (reactance in particular) at each of the other frequencies fall outside the impedance envelope for at least one operating condition. This is a typical characteristic of the baseline tonal liners.

Progressing toward a more broadband design, a second approach accounts for all six frequencies at one flow speed (e.g., cutback). A third approach includes BPF and 2 BPF at the corresponding flow conditions (i.e., 2863 Hz and 5726 Hz at the approach condition, 4061 Hz and 8122 at the cutback condition, etc.). In the second and third approach, N=6 and all weighting values are set to unity (i.e., $W_i=1$). In a fourth approach, all six frequencies at all flow speeds (approach, cutback, and takeoff) are considered using all of the predicted optimum impedance values (N=18 with $W_i=1$).

As a result of the constraint on the grid pattern size, the second, third, and fourth approaches result in the same four cell configuration. Therefore, the resultant broadband liner design considering all frequencies and flow conditions (N=18) actually incorporates the characteristics of the previous two approaches (N=6). The impedance values for this liner design are presented in FIGS. 11-13. Again, the design impedance values are denoted by squares and the envelope of "acceptable" impedance values is represented with dashed lines. The broadband liner satisfies the optimum impedance objectives much better than the baseline liners. In fact, the impedance values at BPF and 2 BPF for the cutback (4061 Hz, 8122 Hz) and takeoff (4641 Hz, 9282 Hz) conditions are within the acceptance criteria for all three flow conditions. It is at the approach fan speeds where difficulties may be identified. As discussed below, it is the initial geometric constraints that make matching the optimum impedance values at this fan speed problematic.

Figure 14A:
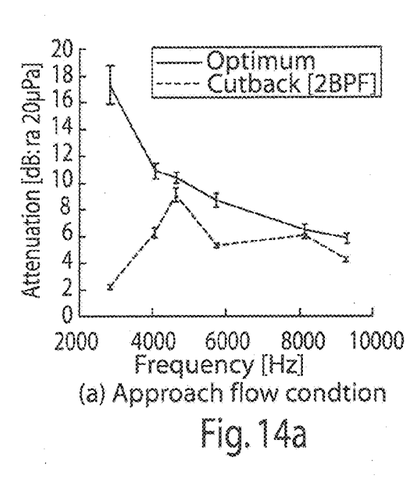
FIG. 14a is a graph showing single tone (cutback 2 BPF) design attenuation values (Approach flow condition) with error bars indicating 95% confidence intervals.
Figure 14B:
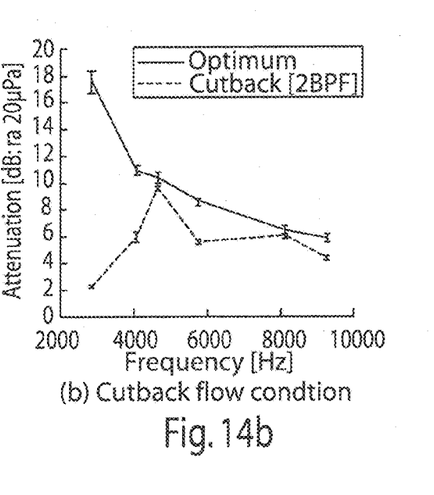
FIG. 14b is a graph showing single tone (cutback 2 BPF) design attenuation values (Cutback flow condition) with error bars indicating 95% confidence intervals.
Figure 14C:
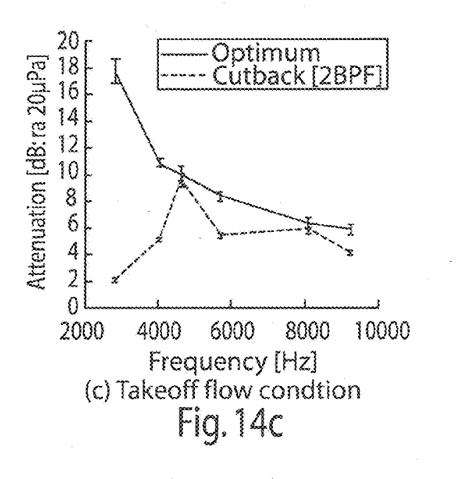
FIG. 14c is a graph showing single tone (cutback 2 BPF) design attenuation values (Takeoff flow condition) with error bars indicating 95% confidence intervals.

The next step in the process is to use the design impedance values 35 in the CDL code using the computer processor at step 40 (FIG. 1) and evaluate the liner performance using in-duct attenuation. This is first performed for the baseline tonal liner designs. Representative results for the 2 BPF/cutback tonal design are provided in FIGS. 14a-14c. In these figures, the mean attenuation achieved with the 2 BPF/cutback tonal design is given by the dashed line. For comparison purposes, the mean attenuation achieved with the optimum impedance values is given by the solid line. Again, for both cases, the error bars represent the 95% confidence intervals for the mean attenuation. The liner performs well at the design frequency and its fundamental (FIG. 14b), as the 95% confidence intervals overlap at these frequencies. However, the mean attenuation achieved at off-design frequencies is well below the optimum levels. FIGS. 14a-14c represent one example of predicted liner performance 45 (FIG. 1).

Figure 15A:
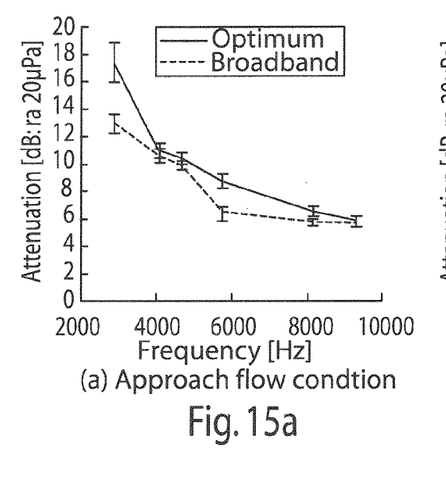
FIG. 15a is a graph showing broadband design attenuation values (Approach flow condition) with error bars indicating 95% confidence intervals.
Figure 15B:
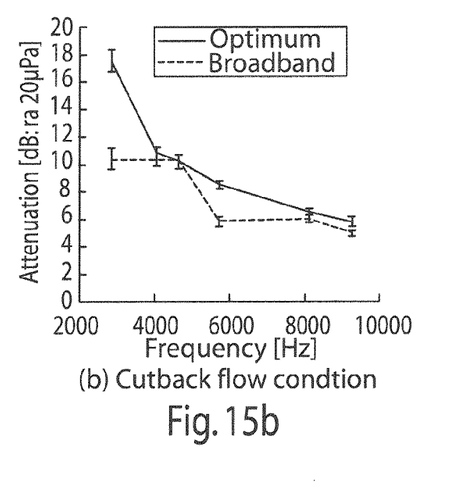
FIG. 15b is a graph showing broadband design attenuation values (Cutback flow condition) with error bars indicating 95% confidence intervals.
Figure 15C:
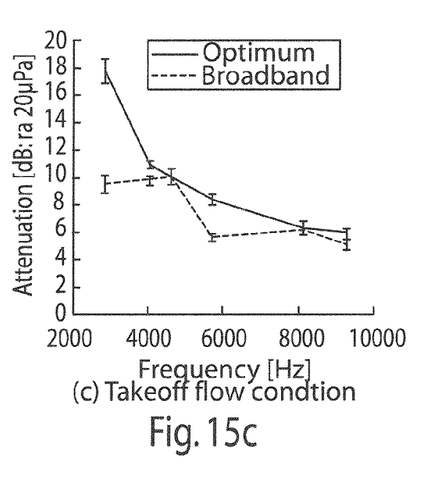
FIG. 15c is a graph showing broadband design attenuation values (Takeoff flow condition) with error bars indicating 95% confidence intervals.

Alternatively, the mean attenuation achieved with the broadband liner is presented in FIGS. 15a-15c. In contrast to the 2 BPF/cutback tonal liner, much better broadband performance is achieved without loss in attenuation at 2 BPF/cutback. As might be expected from the comparison of impedance values, there is overlap in 95% confidence intervals at BPF and 2 BPF for the cutback (4061 Hz, 8122 Hz) and takeoff (4641 Hz, 9282 Hz) conditions for all three flow conditions. However, the difficulties in matching impedance values at the approach fan speeds lead to poor performance at 2863 Hz and 5726 Hz. As alluded to above, it is not possible to achieve the relatively low optimum resistance at 2863 Hz utilizing the liner configurations of FIG. 7. However, alternate liner designs may be utilized to alleviate this problem. For example, the absence of a mesh-cap could be permitted in at least one of the four cells.

Referring again to FIG. 1, the predicted liner performance 45 may be utilized in the duct propagation code at step 15 to predict attenuation or other noise parameter. If the attenuation or other acoustic parameter is determined to be unacceptable, the design of the liner may be modified to provide modified design impedances. For example, the initial design impedances produce unacceptably low attenuation at a given aircraft operating condition, the liner design may be modified to improve attenuation at one aircraft operating condition even though this modification may result in less desirable attenuation at other aircraft operating conditions. In this way, the liner design can be modified utilizing the duct propagation/radiation code in an iterative process to provide a result that is acceptable.

Referring again to FIG. 1, after the liner design has been finalized, liner fabrication and testing 50 may be done to verify the predicted liner performance 45. A post-test comparison 55 may then be conducted between the predicted liner performance and the liner test performance.

What is claimed is:

1. A method of designing an acoustic liner for aircraft, the method being implemented with a computer system comprising at least one computer processor, the method comprising:
   obtaining geometric data corresponding to an aircraft structure that is to include an acoustic liner;
   determining a noise parameter to be evaluated;
   determining a desired outcome with respect to the noise parameter to be evaluated;
   determining a plurality of aircraft operating conditions, the plurality of aircraft operating conditions being evaluated simultaneously;
   providing a plurality of acoustic source pressure distributions for each aircraft operating condition to be evaluated, wherein the power and phase of each acoustic source pressure distribution is substantially random;
   utilizing acoustic prediction code that predicts at least one of acoustic propagation and acoustic radiation to provide a predicted parameter value corresponding to the noise parameter for a plurality of impedance inputs, wherein the impedance inputs comprise pairs of reactance and resistance values that are input into the code for each acoustic source pressure distribution;
   statistically combining the parameter values for each of the plurality of acoustic source pressure distribution to provide a combined parameter value for each pair of reactance and resistance inputs for each aircraft operating condition to be evaluated;
   utilizing predefined criteria relating to the noise parameter to be evaluated to identify a boundary comprising pairs of reactance and resistance values such that impedance values on a first side of the boundary comprise predicted optimum impedance values for each aircraft operating condition satisfy the predefined criteria and impedance values on the other side of the boundary do not satisfy the predefined criteria;
   selecting a plurality of predicted optimum impedance values corresponding to selected ones of the aircraft operating conditions;
   utilizing an impedance prediction code with the computer processor to design a liner, wherein the liner defines design impedance values corresponding to the selected predicted optimum impedance values;
   determining differences between the selected predicted optimum impedance values and the corresponding design impedance values;
   utilizing the differences to determine an optimum liner design that minimizes the effects of the differences according to a predefined criteria.

2. The method of claim 1, wherein:
the geometric data comprises a duct of an aircraft engine.

3. The method of claim 2, wherein:
the noise parameter to be evaluated comprises in-duct attenuation.

4. The method of claim 2, wherein:
the noise parameter to be evaluated comprises a predicted noise level outside the duct.

5. The method of claim 1, wherein:
the combined parameter value comprises a mean value of the noise parameter to be evaluated.

6. The method of claim 5, wherein:
The predicted optimum impedance values for each aircraft operating condition that satisfy the criteria are the impedance values for which a selected confidence interval for the mean value of the noise parameter overlaps with that for the optimum impedance value for each aircraft operating condition.

7. The method of claim 6, wherein:
the aircraft structure comprises an internal passageway of an engine having a fan;
the aircraft operating conditions comprise predicted fan speeds at a selected one of aircraft approach, cutback and takeoff,
the parameter to be evaluated comprises attenuation; and
the selected confidence interval is 95%.

8. The method of claim 1, wherein:
the predefined criteria comprises the square root of the sum of the squares of the differences between the selected predicted optimum impedance values and the design impedance values.

9. The method of claim 8, wherein:
the squares of the differences between the selected predicted optimum impedance values and the design impedance values are multiplied by a weighting value.

10. The method of claim 8, wherein:
at least six predicted optimum impedance values are selected, wherein the at least six optimum impedance values correspond to selected aircraft operating conditions wherein the source pressure distributions comprise at least six different frequencies.

11. The method of claim 10, wherein:
the plurality of aircraft operating conditions to be evaluated comprises at least blade pass frequency and twice the blade pass frequency for at least approach, cutback, and takeoff flight conditions, and flow conditions for at least approach, cutback, and takeoff, whereby the plurality of aircraft operating conditions comprises at least eighteen combinations of frequencies and flow conditions; and
the predicted optimum impedance values correspond to six different frequencies comprising blade pass frequency and twice the blade pass frequency at approach, cutback, and takeoff conditions.

12. The method of claim 11, wherein:
the at least six predicted optimum impedance values correspond to a flow condition selected from the group consisting of approach, cutback, and takeoff flow conditions.

13. The method of claim 12, wherein:
the differences between at least eighteen predicted optimum impedance values and eighteen design impedance values are utilized in connection with the predefined criteria.

* * * * *